(12) United States Patent
Ko et al.

(10) Patent No.: US 11,838,924 B2
(45) Date of Patent: Dec. 5, 2023

(54) METHOD AND DEVICE FOR FEEDBACK REGARDING RECEPTION OF DCI ASSOCIATED WITH SIDELINK IN NR V2X

(71) Applicant: LG ELECTRONICS INC., Seoul (KR)

(72) Inventors: Woosuk Ko, Seoul (KR); Suckchel Yang, Seoul (KR); Hanbyul Seo, Seoul (KR); Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/854,740

(22) Filed: Jun. 30, 2022

(65) Prior Publication Data

US 2022/0338244 A1    Oct. 20, 2022

Related U.S. Application Data

(63) Continuation of application No. 17/507,626, filed on Oct. 21, 2021, now Pat. No. 11,419,141, which is a
(Continued)

(30) Foreign Application Priority Data

Apr. 22, 2019  (KR) .................. 10-2019-0046589
May 9, 2019    (KR) .................. 10-2019-0054107

(51) Int. Cl.
*H04W 72/23*    (2023.01)
*H04W 4/40*     (2018.01)
*H04W 72/20*    (2023.01)

(52) U.S. Cl.
CPC ............. *H04W 72/23* (2023.01); *H04W 4/40* (2018.02); *H04W 72/20* (2023.01)

(58) Field of Classification Search
CPC ........ H04L 1/00; H04L 5/00; H04W 4/40–48; H04W 4/70; H04W 72/20; H04W 72/23;
(Continued)

(56) References Cited

U.S. PATENT DOCUMENTS

2015/0071207 A1    3/2015  Seo ................... H04W 72/1284
                                                              370/329
2016/0301513 A1*  10/2016  He ........................ H04L 5/0098
(Continued)

FOREIGN PATENT DOCUMENTS

KR    10-2018-0017893 A    2/2018
KR    10-2018-0135851 A   12/2018
(Continued)

OTHER PUBLICATIONS

Intel Corporation, "Network controlled sidelink resource allocation design for NR V2X communication", R1-1904295, 3GPP TSG RAN WG1 Meeting #96bis, Xi'an, China, Apr. 8-12, 2019, see sections 1-2.4.

*Primary Examiner* — Thomas R Cairns
(74) *Attorney, Agent, or Firm* — BRYAN CAVE LEIGHTON PAISNER LLP

(57) ABSTRACT

A method of performing wireless communication by a first device is proposed. The method includes receiving downlink control information (DCI) related to first sidelink from a base station, and transmitting, to the base station, a confirmation message for reception of the DCI related to the first sidelink through a first medium access control (MAC) control element (CE). For example, the first MAC CE may include at least one index information related to at least one semi-persistent scheduling (SPS) configuration activated or released by the DCI.

18 Claims, 23 Drawing Sheets

Related U.S. Application Data continuation of application No. PCT/KR2020/005251, filed on Apr. 21, 2020.

(58) Field of Classification Search
CPC . H04W 72/231; H04W 72/232; H04W 72/40; H04W 92/18

See application file for complete search history.

(56) References Cited

U.S. PATENT DOCUMENTS

| | | | |
|---|---|---|---|
| 2020/0313809 A1 | 10/2020 | Park | H04L 5/0091 |
| 2020/0314889 A1 | 10/2020 | Cirik | H04L 5/0092 |
| 2020/0413435 A1 | 12/2020 | Chin | H04W 72/042 |
| 2021/0099254 A1 | 4/2021 | Babaei | H04L 1/1893 |
| 2021/0105126 A1 | 4/2021 | Yi | H04L 5/0055 |
| 2021/0176031 A1 | 6/2021 | Babaei | H04W 76/11 |
| 2021/0367745 A1 | 11/2021 | Zhao | H04L 5/0082 |

FOREIGN PATENT DOCUMENTS

| | | | | |
|---|---|---|---|---|
| KR | 10-2019-0039232 A | 4/2019 | | |
| WO | 2019/064076 A1 | 4/2019 | | |
| WO | WO-2020217797 A1 | 10/2020 | | H04W 72/1289 |

\* cited by examiner (a)

(b)

(a)

(b)

METHOD AND DEVICE FOR FEEDBACK REGARDING RECEPTION OF DCI ASSOCIATED WITH SIDELINK IN NR V2X

This application is a Continuation Application of U.S. patent application Ser. No. 17/507,626 filed on Oct. 21, 2021, which is a Continuation Application of International Application No. PCT/KR2020/005251, filed on Apr. 21, 2020, which claims the benefit of and priority to Korean Application No. 10-2019-0046589, filed on Apr. 22, 2019 and Korean Application No. 10-2019-0054107, filed on May 9, 2019, the contents of which are all hereby incorporated by reference herein in their entirety.

TECHNICAL FIELD

This disclosure relates to a wireless communication system.

BACKGROUND ART

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PCS interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

DISCLOSURE

Technical Problem

Meanwhile, in resource allocation for sidelink communication, there may be a mode in which a base station allocates resources for sidelink transmission to a user equipment (UE) (Mode 1) and a mode in which a UE selects or schedules resources for sidelink transmission through sensing (Mode 2). For example, in Mode 1, the base station may configure one or more resources for sidelink transmission to the UE through higher layer signaling (e.g., radio resource control (RRC signaling) of a downlink channel (e.g., configured grant type-1). In Mode 1, the base station may dynamically activate/release, through a control channel (e.g., a physical downlink control channel (PDCCH), one or more resources allocated to the UE through higher layer signaling (e.g., RRC signaling) (e.g., configured grant type-2). In this case, the UE may transmit, to the base station, feedback information related to whether RRC transmitted through the downlink channel is received through an uplink channel. In addition, for example, the UE may transmit, to the base station, feedback information related to whether to receive downlink control information (DCI) for dynamically activating/releasing resources through a downlink channel (e.g., PDCCH), over a physical uplink shared channel (PUSCH) through a MAC control element (CE) or transmit it to the base station through a physical uplink control channel (PUCCH). In this case, in order for the UE to transmit feedback information related to whether DCI is received through the MAC CE, the base station needs to transmit uplink grant for uplink resource allocation in addition to DCI transmission. Therefore, signaling overhead in a control region may increase. In addition, when the UE transmits the feedback information related to whether DCI is received to the base station through the PUCCH, the UE need to also transmit the feedback information related to whether an existing PDCCH is received. Therefore, two types of feedback information need to be multiplexed and transmitted.

Technical Solution

In an embodiment, a method of performing wireless communication by a first device is proposed. The method includes receiving downlink control information (DCI) related to first sidelink from a base station, and transmitting, to the base station, a confirmation message for reception of the DCI related to the first sidelink through a first medium access control (MAC) control element (CE). For example, the first MAC CE may include at least one index information related to at least one semi-persistent scheduling (SPS) configuration activated or released by the DCI.

Advantageous Effects

A UE can efficiently perform sidelink communication.

MODE FOR INVENTION

Figure 1:
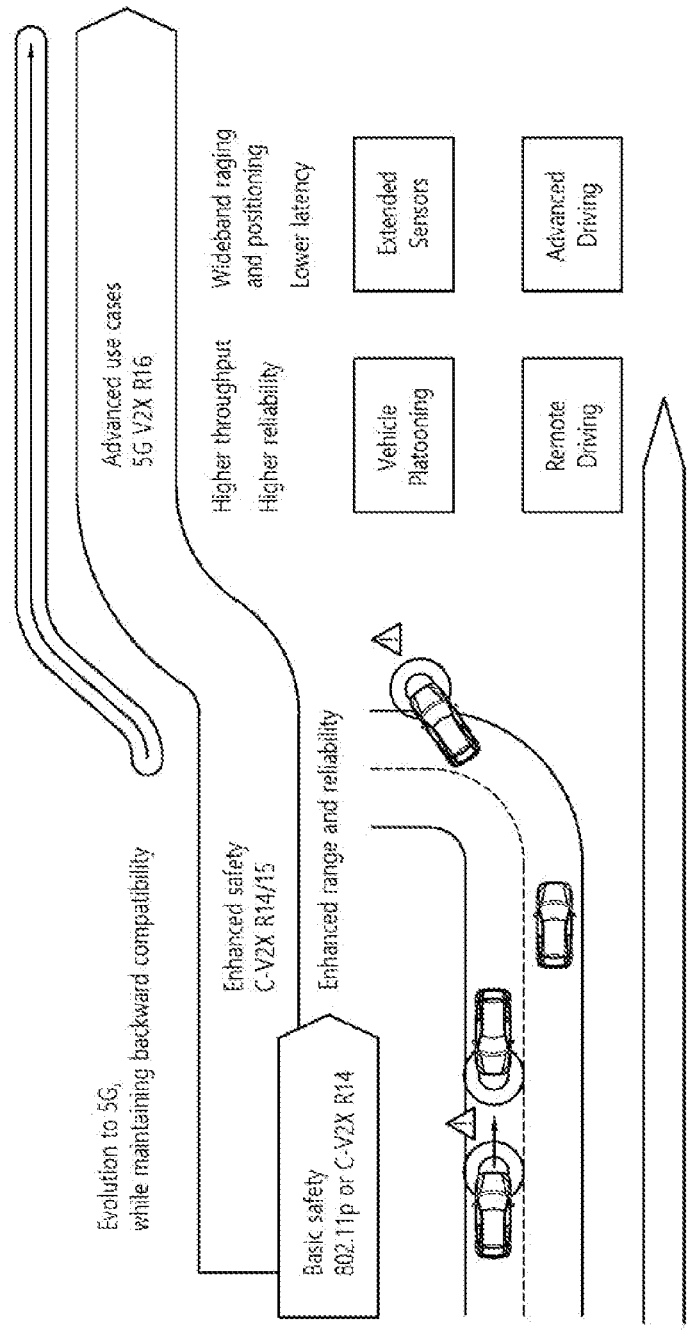
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
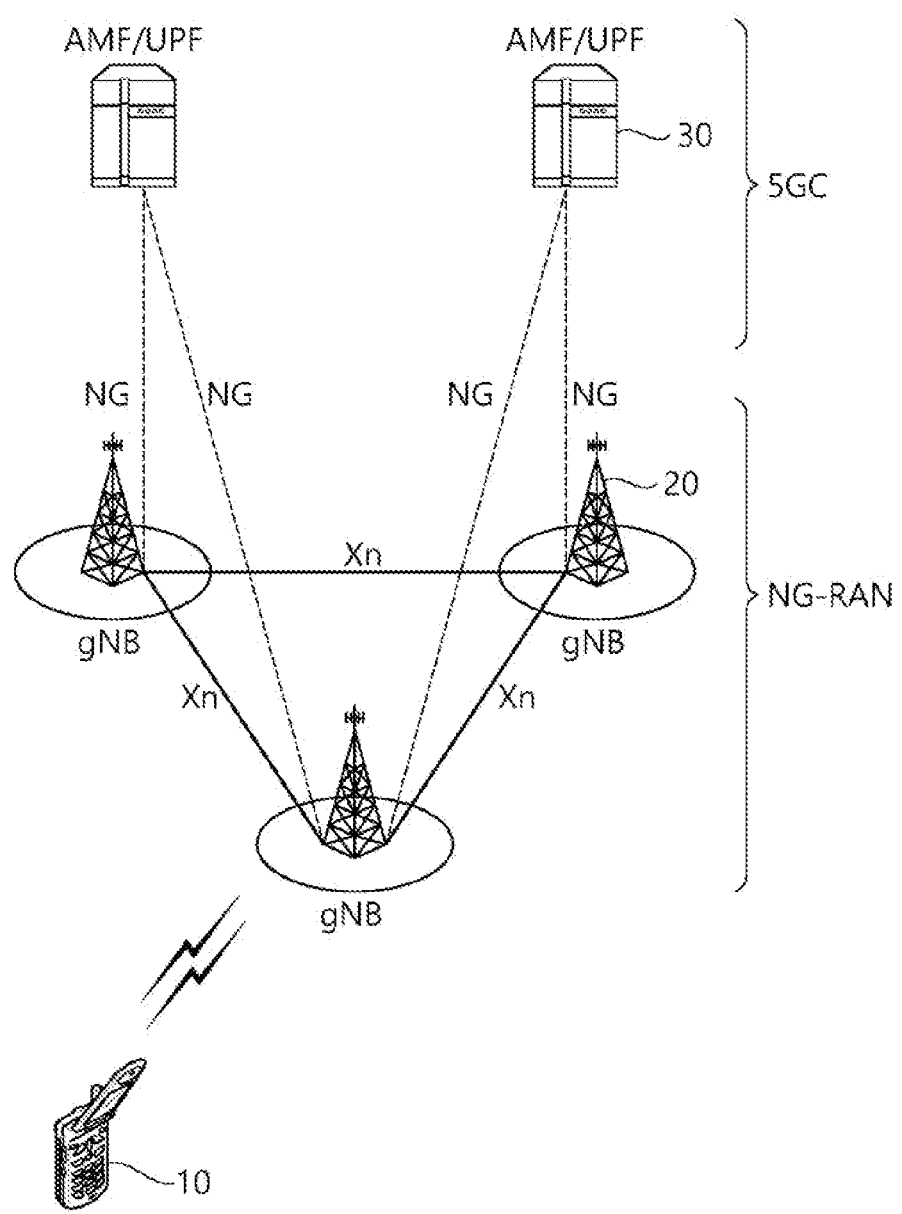
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
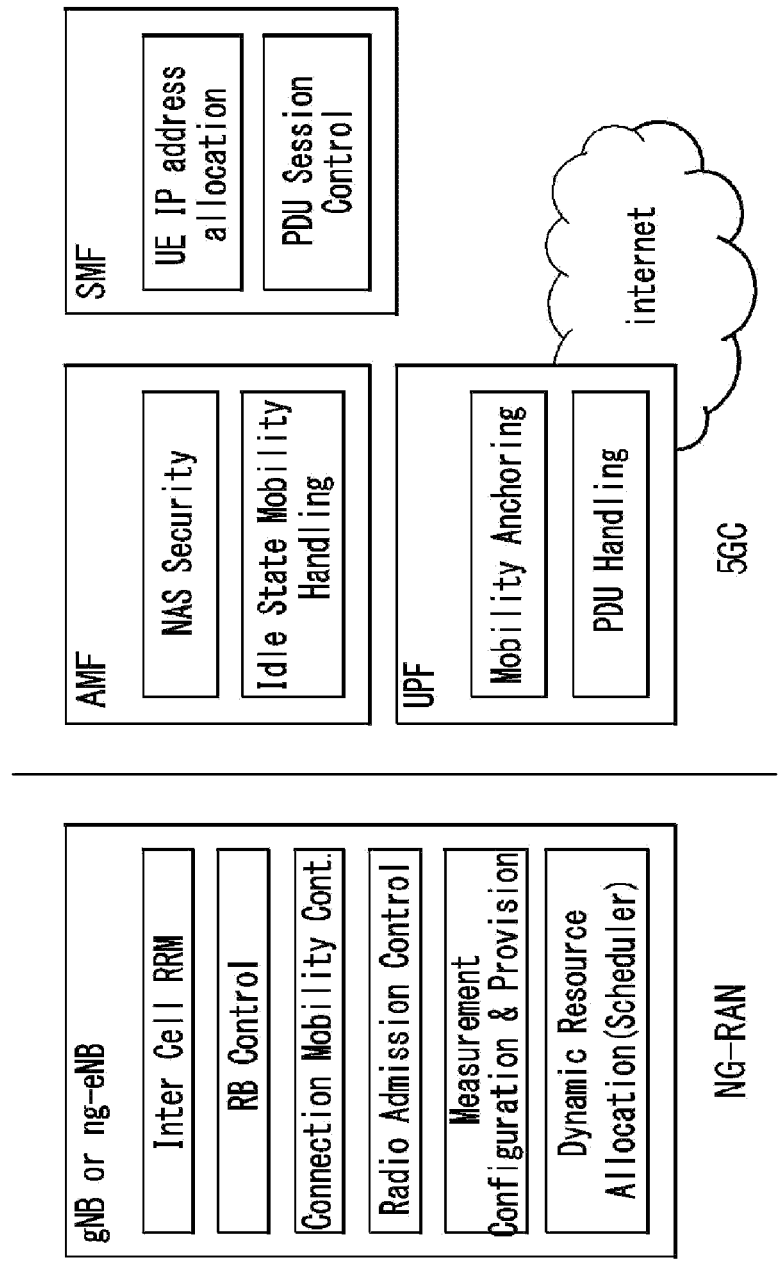
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
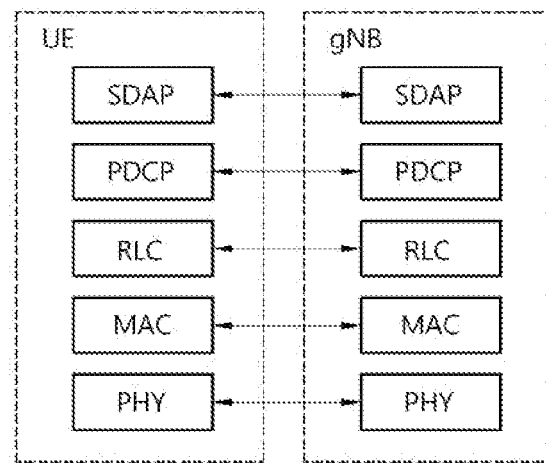
FIG. 4 shows a radio protocol architecture, in accordance with an embodiment of the present disclosure.
Figure 4:
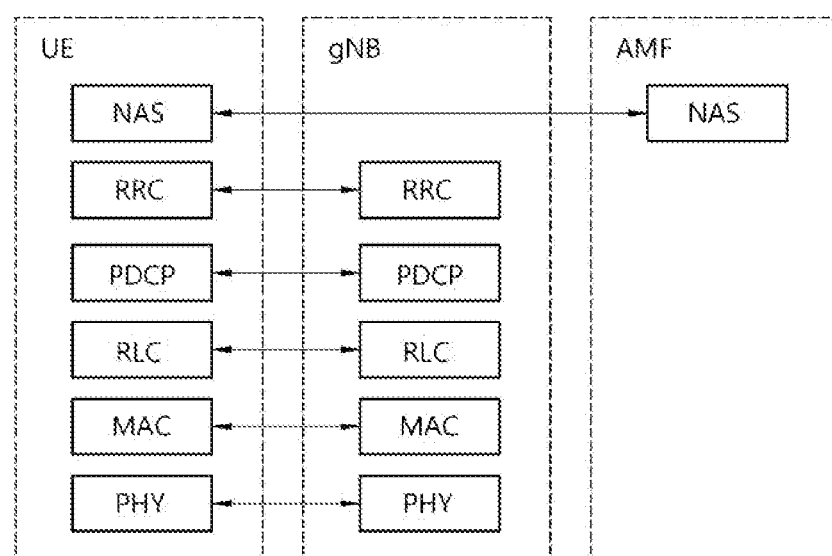

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
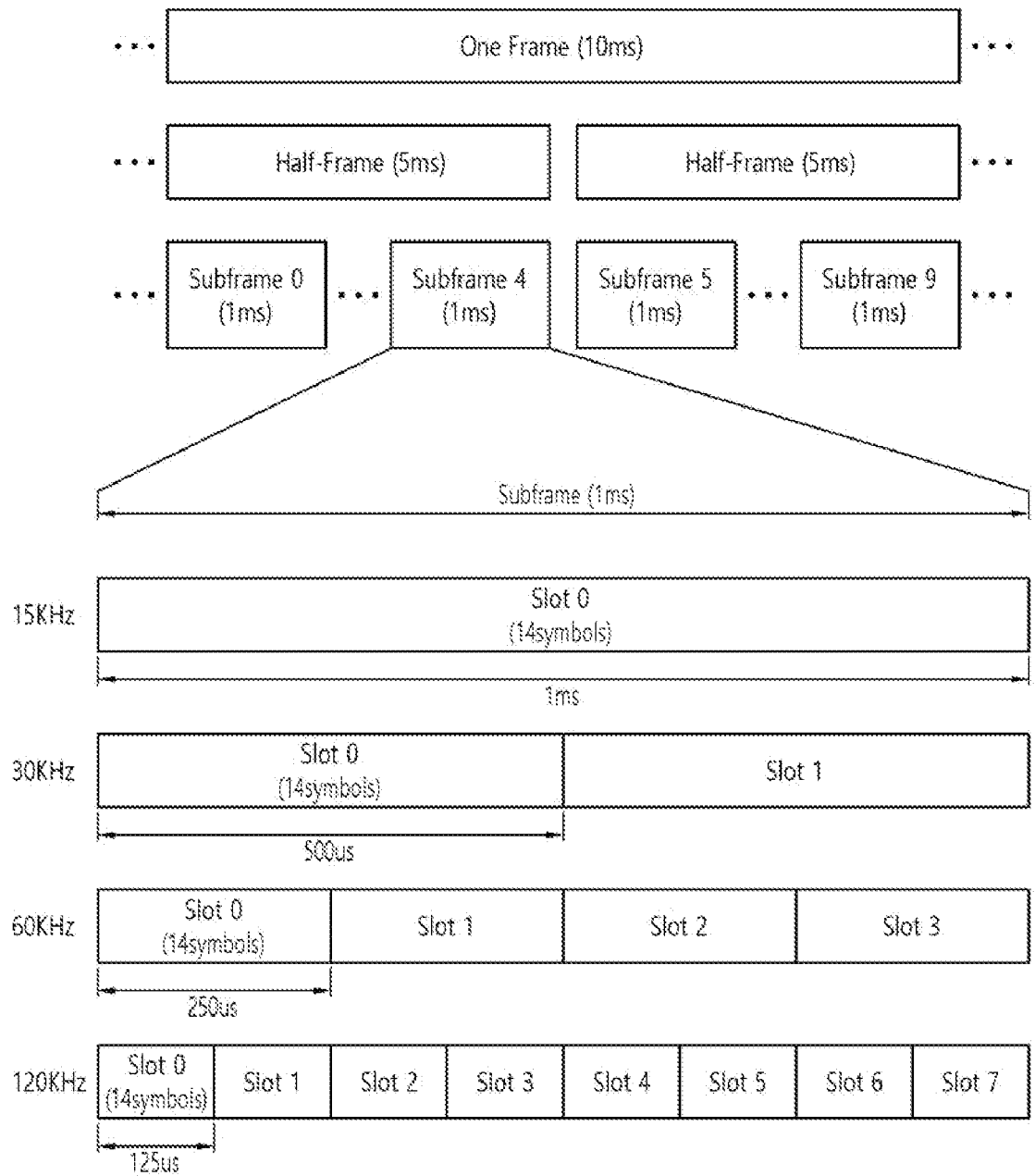
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 1

| SCS (15*2u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2u) | Nslotsymb | Nframe, uslot | Nsubframe, uslot |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |

Figure 6:
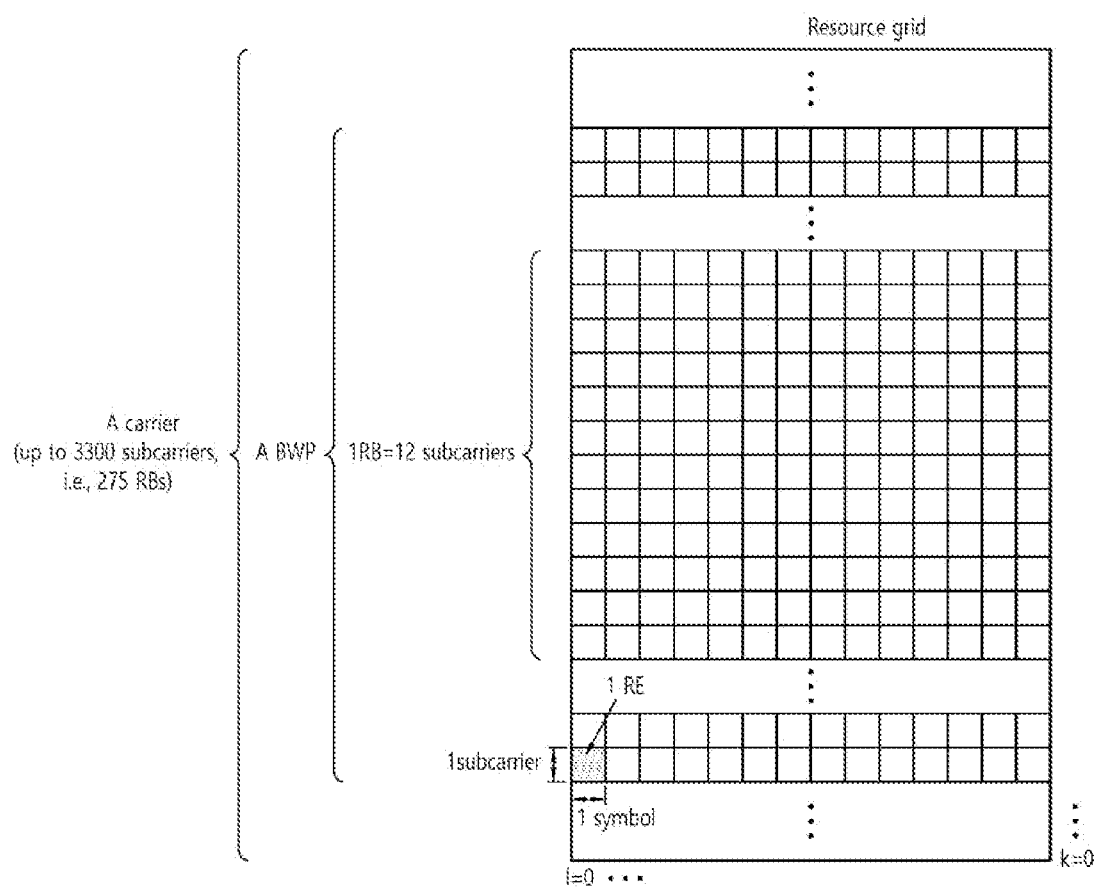
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
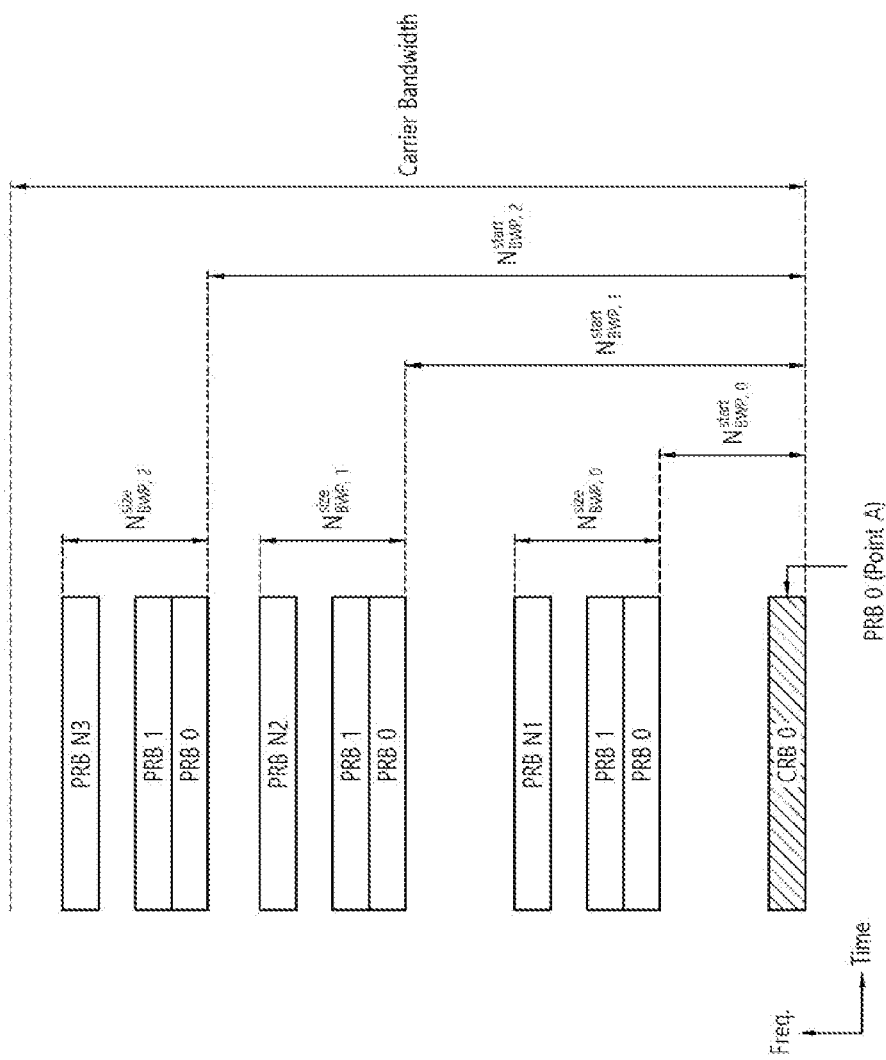
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
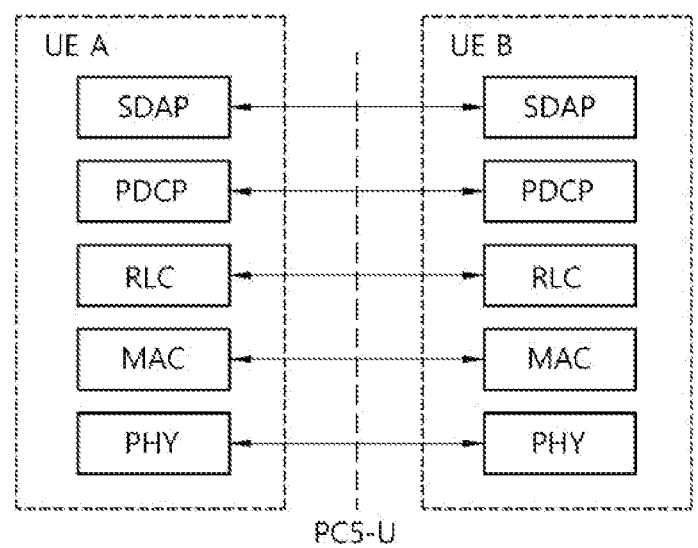
FIG. 8 shows a radio protocol architecture for a SL communication, in accordance with an embodiment of the present disclosure.
Figure 8:
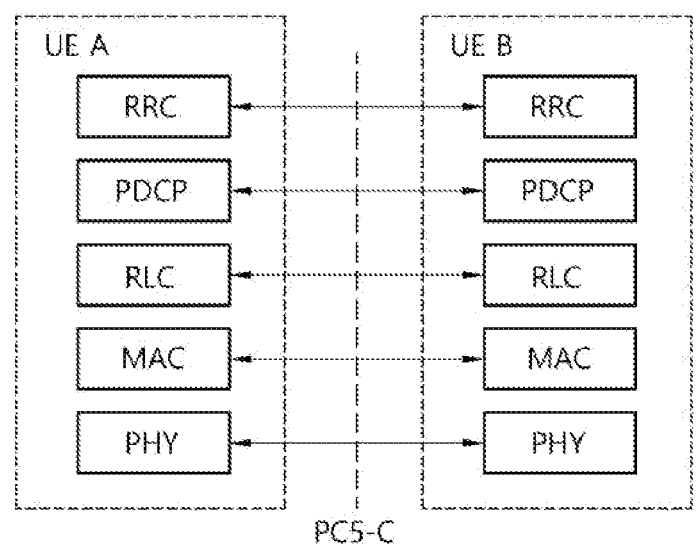

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
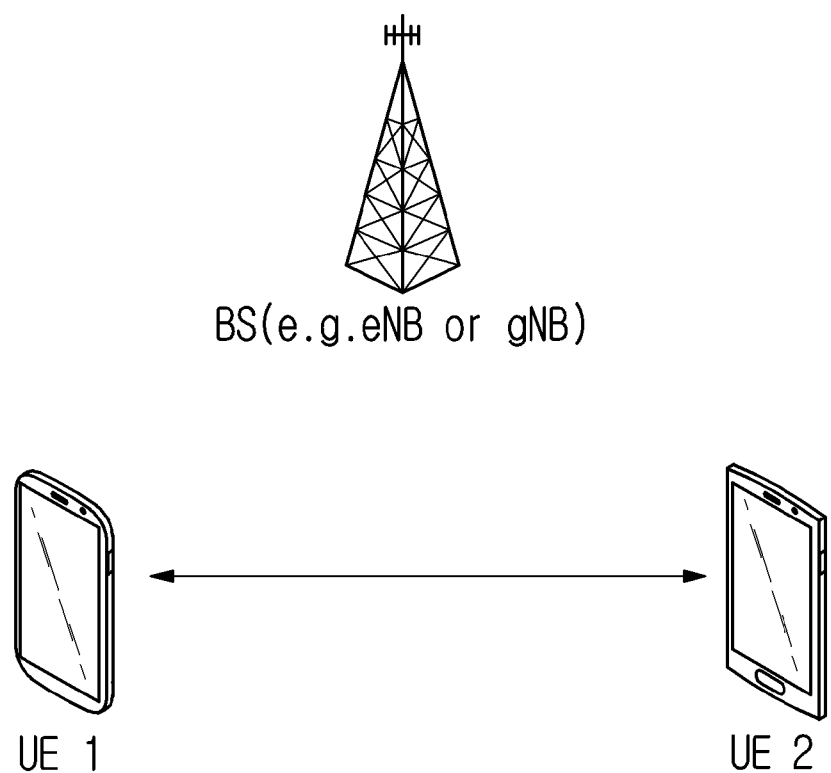
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
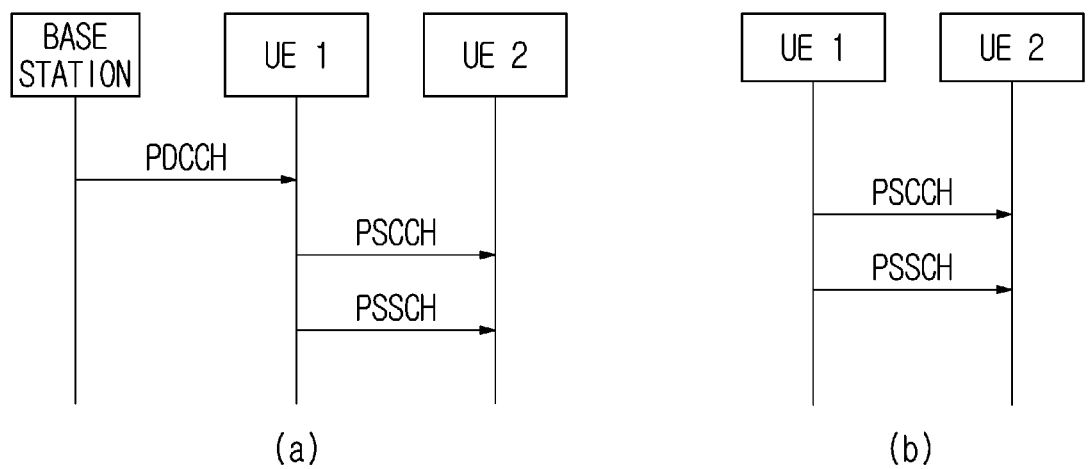
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
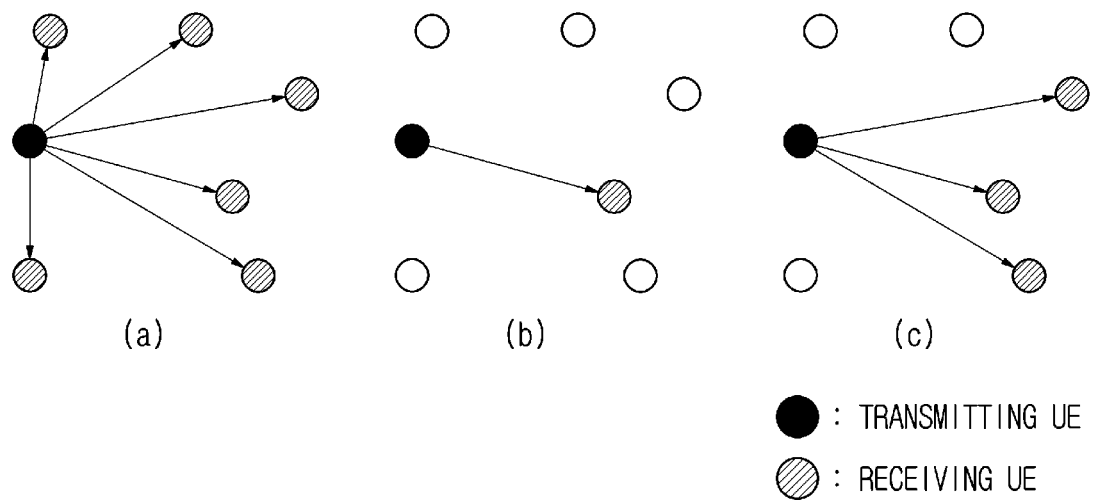
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can transmit and receive information as a communication terminal, select resources for communication with or without the base station's help depending on the situation, and send and receive messages between terminals.

Meanwhile, in resource allocation for sidelink communication, there may be a mode in which a base station allocates resources for sidelink transmission to a user equipment (UE) (Mode 1) and a mode in which a UE selects or schedules resources for sidelink transmission through sensing (Mode 2). For example, in Mode 1, the base station may configure one or more resources for sidelink transmission to the UE through higher layer signaling (e.g., radio resource control (RRC signaling) of a downlink channel (e.g., configured grant type-1). In Mode 1, the base station may dynamically activate/release, through a control channel (e.g., a physical downlink control channel (PDCCH), one or more resources allocated to the UE through higher layer signaling (e.g., RRC signaling) (e.g., configured grant type-2). In this case, the UE may transmit, to the base station, feedback information related to whether RRC transmitted through the downlink channel is received through an uplink channel. In addition, for example, the UE may transmit, to the base station, feedback information related to whether to receive downlink control information (DCI) for dynamically activating/releasing resources through a downlink channel (e.g., PDCCH), on a physical uplink shared channel (PUSCH) through a MAC control element (CE) or transmit it to the base station through a physical uplink control channel (PUCCH). In this case, in order for the UE to transmit feedback information related to whether DCI is received through the MAC CE, the base station needs to transmit uplink grant for uplink resource allocation in addition to DCI transmission. Therefore, signaling overhead in a control region may increase. In addition, when the UE transmits the feedback information related to whether DCI is received to the base station through the PUCCH, the UE need to also transmit the feedback information related to whether an existing PDCCH is received. Therefore, two types of feedback information need to be multiplexed and transmitted.

The present disclosure proposes a method of efficiently transmitting feedback when a UE transmits feedback information related to whether DCI is received through a MAC CE and when a UE transmits feedback information related to whether DCI is received through a PUCCH.

Figure 12:
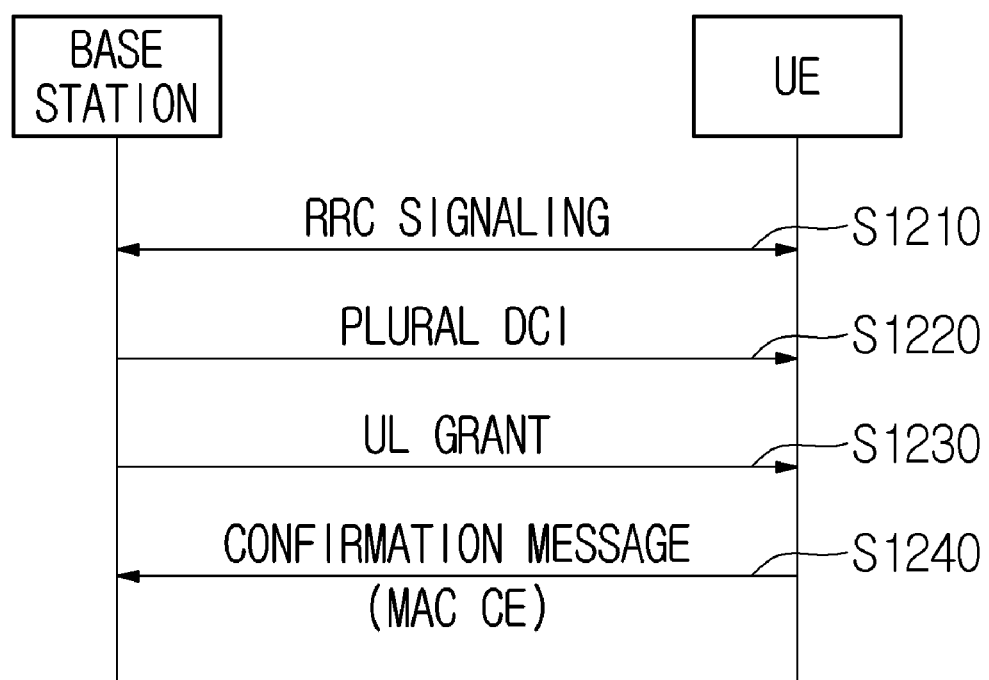
FIG. 12 shows a procedure in which a UE transmits a confirmation message related to whether DCI is received to a base station.
Figure 13:
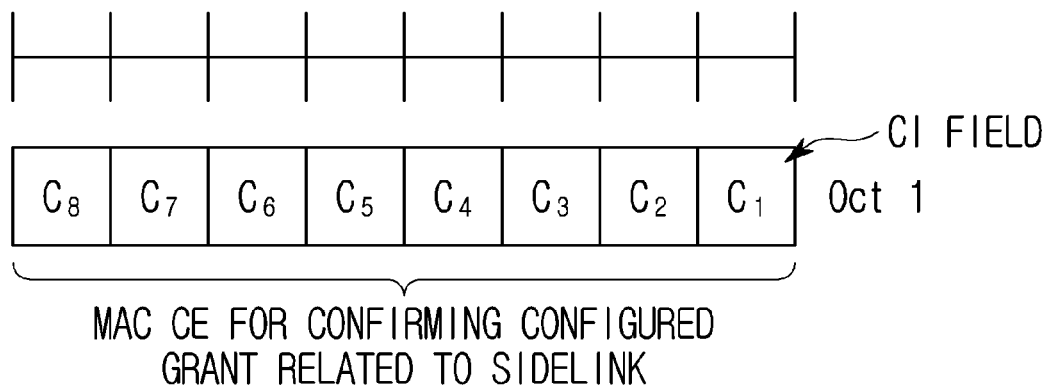
FIG. 13 shows a sidelink configured grant confirmation MAC CE according to an embodiment of the present disclosure.

FIG. 12 shows a procedure in which a UE transmits a confirmation message related to whether DCI is received to a base station. FIG. 13 shows a sidelink configured grant confirmation MAC CE according to an embodiment of the present disclosure. The embodiments of FIGS. 12 and 13 may be combined with various embodiments of the present disclosure.

Referring to FIG. 12, in step S1210, a base station may allocate resource related to sidelink to a UE through RRC signaling. For example, the base station may allocate resource to the UE through RRC signaling in the form of semi-persistent scheduling (hereinafter referred to as SPS) for sidelink transmission in Mode 1.

In step S1220, the base station may transmit a plurality of downlink control information (DCI) to the UE. For example, the plurality of DCI may include DCI related to sidelink and/or DCI related to Uu communication. For example, the base station may transmit the DCI related to sidelink and the DCI related to Uu communication to the UE. For example, the base station may activate/release the resource (e.g., resource in the form of SPS) allocated to the UE through the DCI related to the sidelink.

In step S1230, the base station may transmit a UL grant to the UE. For example, the base station may transmit the DCI related to sidelink to the UE, and the base station may transmit, to the UE, a UL grant for resource to be used to feed back whether DCI related to sidelink is received. For example, the DCI related to sidelink and the UL grant may be transmitted using resources on separate PDCCHs, thereby increasing signaling overhead.

In step S1240, the UE may transmit, to the base station, a confirmation message as to whether the DCI related to sidelink is received through a MAC CE. For example, the UE may receive the DCI related to sidelink, and the UE may transmit, to the base station, a confirmation message as to whether the DCI related to sidelink is received through the MAC CE, after a preset minimum time has elapsed. For example, the UE may transmit, to the base station, a confirmation message as to whether the DCI related to sidelink is received through the MAC CE at a PUSCH transmission time when transmission is first allowed after the preset minimum time has elapsed.

According to an embodiment of the present disclosure, in order for the UE to inform the base station which of the plurality of DCI is to be confirmed, the UE may transmit information related to a time when the DCI is received to the base station along with the confirmation message. For example, the information related to the time when the DCI is received may include a value representing a time interval from a start time of one period within the period of a system frame number (SFN) to a time when DCI is received based on a unit time (e.g., 1 ms). The UE may inform the base station of the time when the DCI is received, such that the UE may inform the base station of DCI which is successfully received among the plurality of DCI transmitted by the base station. Therefore, ambiguity for DCI reception may be removed.

Alternatively, for example, the information related to the time when DCI is received may include a value representing a time interval from a time when the UE transmits a MAC CE over a PUSCH to a time when the UE receives DCI from the base station based on a unit time. In this case, since the information related to the time when the UE receives the DCI includes a value representing a relatively smaller time interval than the time interval related to the start time of the SFN period, a small number of bits may be used as a result, and the UE may reduce overhead necessary to transmit the MAC CE.

For example, when the UE transmits, to the base station, the confirmation message as to whether the DCI related to sidelink is received and the confirmation message as to whether the DCI related to Uu communication is received at the same time, it may be difficult for the base station to distinguish to which DCI the confirmation message is related, using only the information related to a time when the DCI is received. Accordingly, for example, the confirmation message may include an indicator indicating to which DCI it is related and a logical channel ID (LCID), such that the base station distinguishes to which DCI the confirmation message is related. That is, for example, the UE may indicate an indicator indicating to which DCI it is related and a logical channel ID (LCID) in the confirmation message as to whether DCI is received, which is transmitted to the base station through the MAC CE.

Alternatively, for example, the confirmation message may include at least one an application ID, a destination ID, a target UE ID, a session ID, cast type information, service type information, service priority information or service QoS information, such that the base station distinguishes to which DCI the confirmation message is related.

Alternatively, for example, the confirmation message may include a sidelink SPS ID or sidelink SPS configuration index information. Through this, the base station may distinguish among a plurality of different sidelink SPS processes or sidelink SPS configurations based on at least one index information related to at least one SPS configuration. For example, the sidelink SPS configuration index information may include index information of a configured grant related to the DCI for activating/releasing sidelink SPS. For example, the UE may receive one DCI for activating/releasing a plurality of sidelink SPS from the base station, and the UE may transmit, to the base station, a confirmation message as to whether to receive the DCI including the index information of the configured grant related to the DCI for activating/releasing sidelink SPS. Alternatively, for example, the UE may receive a plurality of DCI for activating/releasing sidelink SPS from the base station, and the UE may transmit, to the base station, a confirmation message as to whether to receive the DCI including the index information of the configured grant related to the DCI for activating/releasing sidelink SPS. Through this, the base station may distinguish among a plurality of different SPS configurations. For example, the confirmation message may include configured grant index information, such that the base station distinguishes to which UL grant the confirmation message is related. For example, the base station may check which configured grant is activated/released through the configured grant index included in the confirmation message.

For example, referring to FIG. 13, the MAC CE for transmitting the confirmation message as to whether DCI related to sidelink is received may be referred to as a sidelink configured grant confirmation MAC CE. For example, the side configured grant confirmation MAC CE may be identified by a MAC subheader with a logical channel ID (LCID). For example, the sidelink configured grant confirmation MAC CE may include Ci and R. For example, when there is grant type 2 configured using a CG index i (CGindex i) configured for a MAC entity, Ci may be a field indicating activation/deactivation of a grant configured using a CG index i. For example, R may be a reserved bit, and may be set to a value of 0. For example, when there is no grant type 2 configured using a CG index i (CGindex i) configured for a MAC entity, the MAC entity may ignore the Ci field. For example, when the Ci field is set to 1, the base station may check/determine that the configured grant for the CG index i is activated. For example, when the Ci field is set to 0, the base station may check/determine that the configured grant for the CG index i is deactivated.

Figure 14:
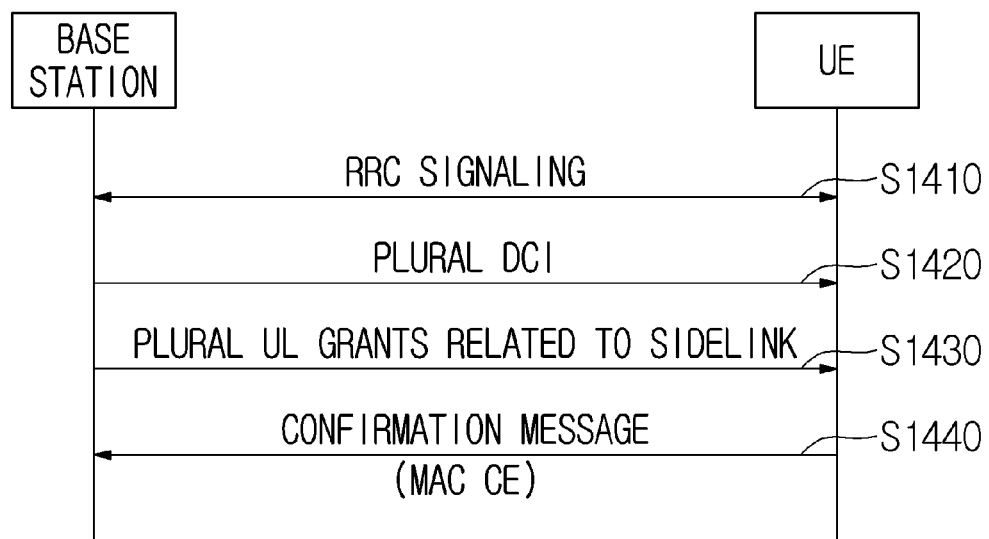
FIG. 14 shows a procedure in which a UE transmits, to a base station, a confirmation message related to whether to DCI is received based on a plurality of uplink grants, according to an embodiment of the present disclosure.

FIG. 14 shows a procedure in which a UE transmits, to a base station, a confirmation message related to whether to DCI is received based on a plurality of uplink grants, according to an embodiment of the present disclosure. The embodiment of FIG. 14 may be combined with various embodiments of the present disclosure.

Referring to FIG. 14, in step S1410, a base station may allocate resource related to sidelink to a UE through RRC signaling. For example, the base station may allocate SPS resource to the UE through RRC signaling for sidelink transmission in Mode 1.

In step S1420, the base station may transmit a plurality of downlink control information (DCI) to the UE. For example, the plurality of DCI may include DCI related to sidelink and/or DCI related to Uu communication. For example, the base station may transmit the DCI related to sidelink and the DCI related to Uu communication to the UE. For example, the base station may activate/release the resource (e.g., resource in the form of SPS) allocated to the UE through the DCI related to sidelink.

In step S1430, the base station may transmit a UL grant related to sidelink to the UE. For example, the base station may transmit a plurality of DCI related to sidelink to the UE, and the base station may transmit, to the UE, a plurality of UL grants for resource to be used to feed back whether the plurality of DCI related to sidelink is received.

In step S1440, the UE may transmit, to the base station, a confirmation message as to whether the plurality of DCI related to sidelink is received through a MAC CE. For example, the UE may receive the plurality of DCI related to sidelink, and the UE may transmit, to the base station, a confirmation message as to whether the plurality of DCI related to sidelink is received through the MAC CE, after a preset minimum time has elapsed. For example, the UE may transmit, to the base station, a confirmation message as to whether the plurality of DCI related to sidelink is received through the MAC CE at a PUSCH transmission time when transmission is first allowed after the preset minimum time has elapsed. For example, the UE may aggregate a confirmation message for at least one DCI which is not confirmed among the plurality of received DCI into one confirmation message and transmit it to the base station through a MAC CE over a PUSCH. For example, the UE may aggregate a confirmation message for at least one first DCI among the plurality of received DCI into a confirmation message based on a newly received UL grant and transmit it to the base station through a MAC CE over a PUSCH. For example, the at least one first DCI may be at least one DCI that the confirmation message as to whether the DCI is received is not transmitted/retransmitted to the base station by a preset number of times among the plurality of received DCI.

According to an embodiment of the present disclosure, when the UE does not receive the UL grant transmitted by the base station, the UE may not transmit the confirmation message as to whether the DCI is received to the base station. In this case, for example, in order to request retransmission, the base station may retransmit the UL grant to the UE or transmit a UL grant for DCI of a next order among the plurality of DCI to the UE. For example, in order for the UE to inform the base station of information on DCI which has been received from the base station up to now but is not confirmed, the UE may aggregate all confirmation messages as to whether the DCI is received, which is not transmitted/retransmitted by the preset number of times (e.g., once), and transmit it according to the newly received UL grant over the PUSCH through the MAC CE. According to various embodiments of the present disclosure, as described above, the DCI related to sidelink and the DCI related to Uu communication may be distinguished, and the UE may distinguish/check whether the confirmation message is retransmitted through a HARQ process ID and/or new data indicator (NDI) included in the received UL grant.

According to an embodiment of the present disclosure, in order for the UE to transmit information related to whether the DCI related to sidelink is received to the base station, the UE may transmit HARQ feedback to the base station through a PUCCH. In this case, for example, compared to a method of transmitting the confirmation message over the PUSCH through the MAC CE, since the base station does not use the resource of the PDCCH to further transmit the UL grant to the UE, signaling overhead may be reduced. For example, PUCCH resources for transmitting HARQ feedback may be configured for the UE in the form of semi-persistent scheduling (SPS) through RRC signaling. For example, the PUCCH resource may be differently configured for each sidelink SPS process ID with respect to the UE.

Figure 15:
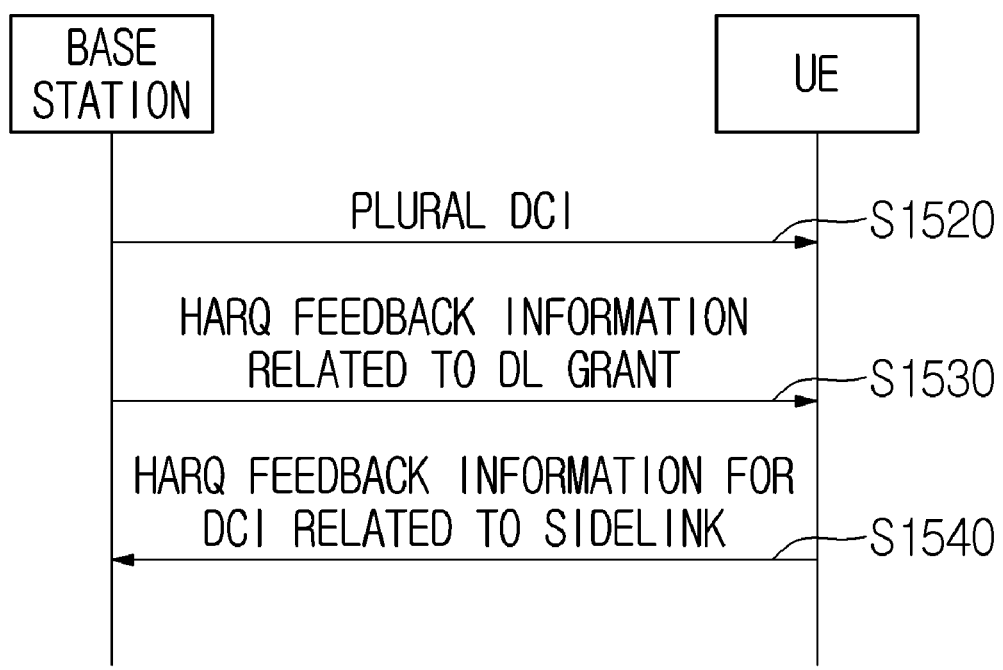
FIG. 15 shows a procedure in which a UE transmits HARQ feedback information for DCI related to sidelink, according to an embodiment of the present disclosure.

FIG. 15 shows a procedure in which a UE transmits HARQ feedback information for DCI related to sidelink, according to an embodiment of the present disclosure. The embodiment of FIG. 15 may be combined with various embodiments of the present disclosure.

Referring to FIG. 15, in step S1510, a base station may transmit a plurality of DCI to a UE. For example, the plurality of DCI may include DCI related to sidelink and/or DCI related to Uu communication. For example, the base station may transmit the DCI related to sidelink and the DCI related to Uu communication to the UE.

In step S1520, the UE may transmit HARQ feedback information related to a DL grant to the base station. For example, the HARQ feedback information may include HARQ ACK information or HARQ NACK information. For example, the UE may transmit the HARQ feedback information related to the DL grant to the base station over a PUCCH.

In step S1530, the UE may transmit the HARQ feedback information for the DCI related to sidelink to the base station. For example, the UE may transmit the HARQ feedback information for the DCI related to sidelink to the base station over a PUCCH. For example, resource on the PUCCH for HARQ feedback information may be allocated/configured to/for the UE through RRC in the form of semi-persistent scheduling (SPS). Alternatively, for example, the base station may allocate a PUCCH resource set transmittable for each sidelink SPS process ID to the UE through DCI. Here, for example, the base station may instruct the user to use specific resource in the PUCCH resource set using a PUCCH resource indicator (PRI).

According to an embodiment of the present disclosure, for example, resource related to sidelink may be allocated/configured to/for the UE through RRC signaling. For example, the base station may allocate resource in the form of SPS to the UE for sidelink transmission in Mode 1 through RRC signaling. For example, the UE may allocate/configure resource on a PUCCH for transmitting HARQ feedback to the base station to/for the UE through RRC. For example, the resource on the PUCCH may differently allocate/configure the resource on the PUCCH to/for the UE for each sidelink SPS process ID.

Alternatively, according to an embodiment of the present disclosure, the base station may allocate a PUCCH resource set transmittable for each sidelink SPS process ID to the UE through DCI. For example, the base station may instruct the UE to use specific resource in the PUCCH resource set using a PUCCH resource indicator (PRI). For example, when the UE transmits HARQ feedback information as to whether DCI (e.g., a DL grant) related to Uu communication is received and HARQ feedback information as to whether DCI related to sidelink is received at the same time, the base station may define/configure resource on the PUCCH indicated by the PRI field on the DL grant and resource on the PUCCH for transmitting the HARQ feedback information as to whether DCI related to sidelink is received to be the same. To this end, the UE may multiplex two types of HARQ feedback information and transmit it through the same PUCCH resource.

Alternatively, for example, the UE may transmit HARQ feedback to the base station with respect to DCI having higher priority between the DCI related to Uu communication or the DCI related to sidelink through resource on the PUCCH based on a service type, priority, QoS and/or a cast type. Alternatively, for example, the UE may transmit only the HARQ feedback information for the preset DCI (e.g., DCI related to Uu communication) through resource on the PUCCH, and skip transmission of the HARQ feedback information for the other DCI (e.g., DCI related to sidelink). Alternatively, for example, the UE may piggyback the HARQ feedback information for the DCI related to sidelink on the HARQ feedback information for the DCI related to Uu communication (e.g., DCI related to the downlink grant) and transmit it. Alternatively, for example, the UE may piggyback the HARQ feedback information for the DCI related to Uu communication (e.g., DCI related to the downlink grant) on the HARQ feedback information for the DCI related to sidelink and transmit it.

According to an embodiment of the present disclosure, when HARQ feedback information for one DCI related to sidelink and HARQ feedback information for one DCI related to Uu communication (e.g., DCI related to a downlink grant) are multiplexed and simultaneously transmitted, the UE may transmit the multiplexed information through a short PUCCH format. The short PUCCH format may transmit information with a relatively smaller number of bits. For example, when HARQ feedback information for a plurality of DCI related to sidelink and a plurality of DCI related to Uu communication (e.g., DCI related to a DL grant) are multiplexed and simultaneously transmitted, the UE may transmit the multiplexed information through a long PUCCH format. The long PUCCH format may transmit information with a relatively large number of bits. Alternatively, for example, when the UE transmits a plurality of information with a large number of bits, the UE may separately transmit HARQ feedback information for the DCI related to sidelink and HARQ feedback information for the DCI related to Uu communication. In this case, for example, resource on the PUCCH used for two HARQ feedback information are configured to be close to each other in a frequency domain for the UE. That is, the UE may be allocated resource on the PUCCH such that there is no gap between two PUCCH resources in the frequency domain.

According to an embodiment of the present disclosure, when a plurality of PDSCHs is transmitted in one slot for DL transmission, the UE may configure/determine a bitmap in which one bit is allocated to HARQ feedback information for each PDSCH reception. For example, the UE may transmit, to the base station, a bitmap configured/determined as HARQ feedback information for multiple PDSCH reception. That is, for example, the UE may transmit feedback information for first PDSCH reception as a first bit on the bitmap and transmit feedback information for second PDSCH reception as a second bit on the bitmap. For example, when DCI for sidelink SPS activation/release is additionally transmitted through the PDCCH, the UE may use a specific bit in the bitmap on the PUCCH configured/determined for HARQ feedback information for PDSCH reception to transmit HARQ feedback information for DCI reception for sidelink SPS activation/release. Here, for example, the specific bit in the bitmap may be configured for the UE through RRC signaling. For example, when DCI for DL SPS activation/release is additionally transmitted through the PDCCH, the UE may use a specific bit in the bitmap on the PUCCH configured/determined for HARQ feedback information for PDSCH reception to transmit HARQ feedback information for DCI reception for DL SPS activation/release. Accordingly, for example, when both two types of DCI (DCI for sidelink SPS activation/release and DCI for DL SPS activation/release) are transmitted through the PDCCH, a total number of the two types of DCI transmitted through the PDCCH may be less than or equal to the total number of PDSCHs transmitted through the corresponding slot.

Alternatively, for example, the UE may transmit HARQ feedback with respect to DCI having higher priority between the DCI related to Uu communication or the DCI related to sidelink through PUCCH resource based on a service type, priority, QoS and/or a cast type. Alternatively, for example, the UE may transmit only the HARQ feedback information for the preset DCI (e.g., DCI related to Uu communication) through PUCCH resource, and skip transmission of the HARQ feedback information for the other DCI (e.g., DCI related to sidelink). Even in this case, when both two types of DCI (DCI for sidelink SPS activation/release and DCI for DL SPS activation/release) are transmitted through the PDCCH, a total number of the two types of DCI transmitted through the PDCCH may be less than or equal to the total number of PDSCHs transmitted through the corresponding slot.

According to an embodiment of the present disclosure, in order to confirm DCI reception for sidelink SPS activation/release, a simplified UL grant may be used. For example, when the simplified UL grant is used, it is possible to reduce signaling overhead due to the UE receiving an uplink grant from the base station to transmit a confirmation message through a MAC CE. When the simplified UL grant is used, the UE may reduce complexity of multiplexing two types of HARQ feedback information.

For example, a time domain grid/frequency domain grid related to allocation of PUSCH resource may be set large. For example, the base station/network may set a time domain grid/frequency domain grid related to allocation of PUSCH resource large. For this reason, for example, it is possible to reduce the number of bits of a resource allocation field of the time domain and the number of bits of a resource allocation field of the frequency domain necessary to allocate PUSCH resource. For example, information on the time domain grid/frequency domain grid necessary to allocate PUSCH resource, rank and/or precoding information may be configured for the UE through RRC signaling.

For example, when the base station/network schedules PSSCH resource for the UE in the form of SPS through RRC signaling, a time domain grid/frequency domain grid related to allocation of PSSCH resource may be set large. For this reason, for example, it is possible to reduce the number of bits of a resource allocation field of the time domain and the number of bits of a resource allocation field of the frequency domain necessary to allocate PSSCH resource. Accordingly, the number of bits used in the PSSCH resource allocation field included in DCI for activating/releasing PSSCH resource may be reduced, and signaling overhead of DCI for sidelink SPS activation/release may be reduced.

For example, a time domain grid/frequency domain grid related to allocation of PUSCH resource and a time domain grid/frequency domain grid related to allocation of PSSCH resource may be set large. For example, the base station/network may set a time domain grid/frequency domain grid related to allocation of PUSCH resource and a time domain grid/frequency domain grid related to allocation of PSSCH resource large. Through this, for example, scheduling information related to a PUSCH necessary to transmit a confirmation message through a MAC CE may be included and transmitted in DCI.

According to various embodiments of the present disclosure, the base station may activate/release resource allocated as sidelink SPS through DCI related to sidelink and then change operation for resource allocated as sidelink SPS before the UE transmits a confirmation message as to whether DCI is received or HARQ feedback information to the base station. For example, the base station may activate resource allocated as sidelink SPS through DCI related to sidelink and then release resource allocated as sidelink SPS through DCI related to sidelink before the UE transmits a confirmation message as to whether DCI is received or HARQ feedback information to the base station. Alternatively, for example, the base station may release resource allocated as sidelink SPS through DCI related to sidelink and then activate resource allocated as sidelink SPS through DCI related to sidelink before the UE transmits a confirmation message as to whether DCI is received or HARQ feedback information to the base station. Alternatively, for example, the base station may activate/release first resource allocated as sidelink SPS through DCI related to sidelink and then activate/release second resource allocated as sidelink SPS before the UE transmits a confirmation message as to whether DCI is received or HARQ feedback information to the base station. In this case, for example, the base station may not transmit a change instruction related to resource allocated as sidelink SPS to the UE during a preset minimum time from when the UE receives DCI for activating/releasing resource allocated as sidelink SPS to when the UE transmits a confirmation message for reception of the DCI. For example, the UE may expect that the base station does not transmit a change instruction related to resource allocated as sidelink SPS to the UE during a preset minimum time from when the UE receives DCI for activating/releasing resource allocated as sidelink SPS to when the UE transmits a confirmation message for reception of DCI.

For example, until the UE transmits the confirmation message as to whether the DCI is received to the base station, the UE may operate based on an activation/release sidelink SPS activation/release instruction received from the base station. For example, the UE may operate according to a previously set sidelink SPS activation/release instruction based on a preset minimum SPS duration/period, and the UE may operate based on a new sidelink SPS activation/release instruction from the base station after transmitting the confirmation message as to whether DCI is received to the base station.

Alternatively, for example, although the UE transmits the confirmation message as to whether the DCI is received to the base station, the UE may operate based on the sidelink SPS activation/release instruction received from the base statin until the UE determines that the base station has received the confirmation message. For example, the UE may operate according to the previously set sidelink SPS activation/release instruction based on a preset minimum SPS duration/period, and operate based on a new sidelink SPS activation/release instruction from the base station after the UE determines that the base station has received the confirmation message as to whether the DCI is received. For example, when the same ID as the HARQ process ID included in the confirmation message is included in the UL grant received by the UE and NDI is toggled, the UE may determine that the base station has successfully received the confirmation message. For example, the UE may determine that the base station has successfully received the confirmation message based on the HARQ process ID in the received UL grant and the NDI.

According to an embodiment of the present disclosure, after the UE receives sidelink SPS activation/release DCI from the base station, the base station may set a time when the UE will operate according to an instruction related to sidelink SPS activation/release for the UE. For example, after the UE receives sidelink SPS activation/release DCI from the base station, a time when the UE will operate according to the instruction related to sidelink SPS activation/release may be set in advance for the UE. For example, the instruction related to sidelink SPS activation/release may be set in advance for the UE. For example, the base station may set a time when the UE will operate according to the instruction related to sidelink SPS activation/release in advance for the UE through DCI for sidelink SPS activation/release.

The present disclosure relates to a method of feeding, by a UE, whether DCI is received back to a base station when use of sidelink resource is activated/released for the UE, by transmitting DCI for sidelink SPS activation/release with respect to sidelink resource allocated in the form of SPS from the base station to the UE through higher layer signaling (e.g., RRC signaling). For example, according to various embodiments of the present disclosure, the UE may transmit, to the base station, a confirmation message related to whether the DCI is received through a MAC CE, and the UE may inform the base station of the position in the time domain related to the reception time of the DCI. To this end, for example, the base station may determine each of a plurality of DCI transmitted to the UE based on the reception time of the DCI. In addition, for example, according to various embodiments of the present disclosure, when the UE transmits HARQ feedback information to the base station through a PUCCH, HARQ feedback information related to sidelink and HARQ feedback information related to DL may be efficiently multiplexed. In addition, for example, according to various embodiments of the present disclosure, signaling overhead of DCI for sidelink SPS activation/release and the UL grant may be reduced.

Figure 16:
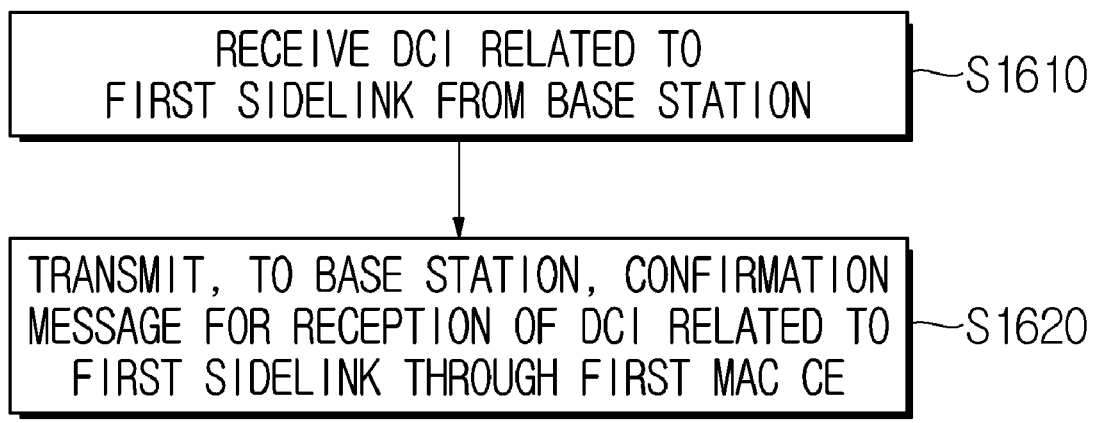
FIG. 16 shows a method of transmitting, by a first device 100, a confirmation message related to whether to receive DCI to a base station, according to an embodiment of the present disclosure.

FIG. 16 shows a method of transmitting, by a first device 100, a confirmation message related to whether to receive DCI to a base station, according to an embodiment of the present disclosure. The embodiment of FIG. 16 may be combined with various embodiments of the present disclosure.

Referring to FIG. 16, in step S1610, the first device 100 may receive DCI related to first sidelink from a base station. In step S1620, the first device 100 may transmit, to the base station, a confirmation message for reception of DCI related to the first sidelink through a first MAC CE. For example, the first MAC CE may include at least one index information related to at least one semi-persistent scheduling (SPS) configuration activated or released by the DCI. For example, the base station may distinguish among a plurality of different sidelink SPS configurations based on at least one index information related to at least one SPS configuration. For example, the sidelink SPS configuration index information may include index information of a configured grant related to DCI for activating/releasing sidelink SPS. For example, the first device 100 may receive, from the base station, one DCI for activating/releasing a plurality of sidelink SPS, and the first device 100 may transmit, to the base station, a confirmation message as to whether the DCI including the index information of the configured grant related to the DCI for activating/releasing sidelink SPS is received. For example, the first device 100 may receive, from the base station, a plurality of DCI for activating/releasing sidelink SPS, and the first device 100 may transmit, to the base station, a confirmation message as to whether the DCI including the index information of the configured grant related to the DCI for activating/releasing sidelink SPS is received.

For example, the first MAC CE may include time information of the DCI related to the first sidelink. For example, the time information of the DCI related to the first sidelink may include information related to a start time of a system frame number (SFN) period in the period of the SFN and a time when the DCI related to the first sidelink is received from the base station. For example, the time information of the DCI related to the first sidelink information may include information related to a time when the first MAC CE is transmitted to the base station through a physical uplink shared channel (PUSCH) and a time when the DCI related to the first sidelink is received from the base station. For example, the first 1 MAC CE may include at least one of application ID information, destination ID information, target device ID information, session ID information, cast type information, service type information, priority information or information related to quality of service (QoS). For example, the first MAC CE may include process ID information related to the first sidelink. For example, the first MAC CE may include process ID information related to the first sidelink.

For example, the first device 100 may receive DCI related to Uu communication from the base station. For example, the first device 100 may transmit, to the base station, a confirmation message for reception of the DCI related to Uu communication through a second MAC CE. For example, the first MAC CE and the second MAC CE may include a logical channel ID (LCID). For example, the first MAC CE and the second MAC CE may include information for identifying DCI related to the first sidelink and DCI related to Uu communication. For example, the first device 100 may transmit the first MAC CE and the second MAC CE to the base station over a PUSCH.

For example, the first device 100 may receive DCI related to a second sidelink from the base station. For example, based on the first device 100 doing not transmit the confirmation message for reception of the DCI related to the second sidelink to the base station, the confirmation message for reception of the DCI related to the second sidelink may be included in the first MAC CE.

For example, the first device 100 may transmit the first MAC CE to the base station over the PUSCH. For example, at least one of a time domain resource grid or a frequency domain resource grid used for resource allocation for the PUSCH may be set widely. For example, resource on a physical sidelink shared channel (PSSCH) related to the first sidelink may be scheduled by the base station for the first device 100. For example, at least one of a time domain resource grid or a frequency domain resource grid used for resource allocation for the PSSCH may be set widely.

The above-described embodiment is applicable to various devices described below. For example, a processor 102 of the first device 100 may control a transceiver 106 to receive the DCI related to the first sidelink from the base station. In addition, the processor 102 of the first device 100 may control the transceiver 106 to transmit a confirmation message for reception of the DCI related to the first sidelink to the base station through the first MAC CE.

According to an embodiment of the present disclosure, a first device for performing wireless communication may be provided. For example, the first device may include one or more memories configured to store commands; one or more transceivers; and one or more processors connecting the one or more memories and the one or more transceivers. For example, the one or more processors may execute the commands to receive downlink control information (DC) related to first sidelink from a base station and to transmit, to the base station, a confirmation message for reception of the DCI related to the first sidelink. For example, the first MAC CE may include at least one index information related to at least one semi-persistent scheduling (SPS) configuration activated or released by the DCI.

According to an embodiment of the present disclosure, an device configured to control a first UE may be provided. For example, the device may include one or more processors; and one or more memories connected to be executable by the one or more processors and configured to commands. For example, the one or more processors may execute the commands to transmit, to the base station, a confirmation message for reception of the DCI related to the first sidelink through a first medium access control (MAC) control element (CE). For example, the first MAC CE may include at least one index information related to at least one semi-persistent scheduling (SPS) configuration activated or released by the DCI.

According to an embodiment of the present disclosure, a non-transitory computer-readable storage medium having recorded thereon commands may be provided. For example, the commands, when executed by one or more processors, enable the one or more processors to receive downlink control information (DCI) related to first sidelink, by a first device, and to transmit, to the base station, a confirmation message for reception of DCI related to the first sidelink through a medium access control (MAC) control element (CE), by the first device. For example, the first MAC CE may include at least one index information related to at least one semi-persistent scheduling (SPS) configuration activated or released by the DCI.

Figure 17:
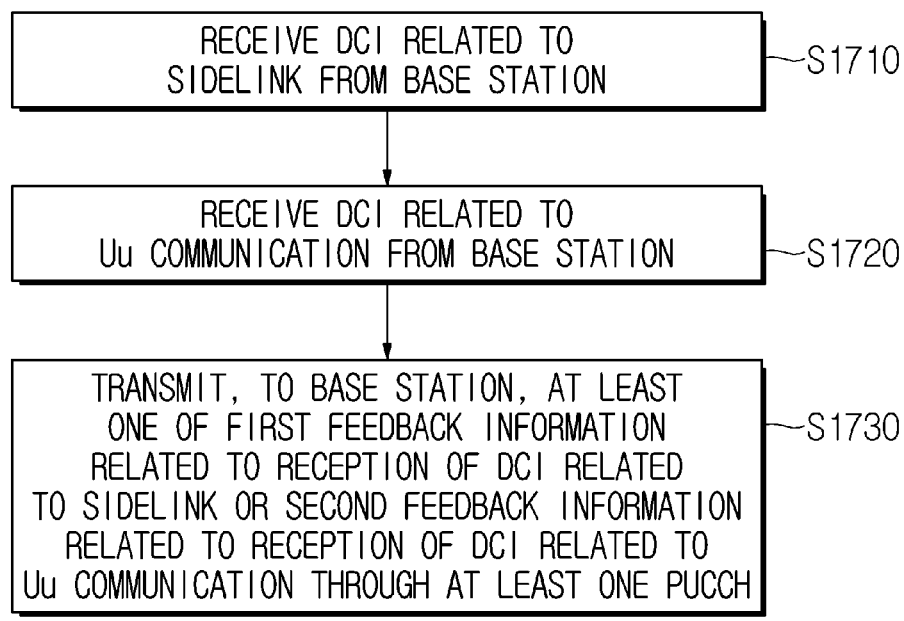
FIG. 17 shows a method of transmitting, by a first device 100, feedback information related to whether to receive DCI to a base station, according to an embodiment of the present disclosure.

FIG. 17 shows a method of transmitting, by a first device 100, feedback information related to whether to receive DCI to a base station, according to an embodiment of the present disclosure. The embodiment of FIG. 17 may be combined with various embodiments of the present disclosure.

Referring to FIG. 17, in step S1710, the first device 100 may receive DCI related to a sidelink from a base station. For example, the first device 100 may receive a plurality of DCI from the base station. For example, the first device 100 may receive, from the base station, DCI related to the sidelink and DCI related to Uu communication.

In step S1720, the first device 100 may transmit, to the base station, feedback information related to reception of the DCI related to sidelink through a PUCCH. For example, resource on the PUCCH may be differently configured based on a process ID related to the sidelink. For example, the resource on the PUCCH may be determined based on a PUCCH resource indicator (PRI). For example, the PRI may be transmitted to the first device 100 by the base station. For example, the base station may allocate a PUCCH resource set transmittable for each sidelink SPS process ID to the first device 100 through the DCI. For example, feedback information related to reception of the DCI related to the sidelink may include HARQ ACK information or HARQ NACK information. For example, resource on the PUCCH for transmitting the HARQ feedback information may be allocated/configured to/for the first device 100 in the form of semi-persistent scheduling (SPS) through RRC.

For example, the first device 100 may transmit, to the base station, HARQ feedback through resource on the PUCCH in response to DCI having higher priority between DCI related to Uu communication or DCI related to sidelink based on a service type, priority, QoS and/or a cast type.

For example, the first device 100 may transmit only HARQ feedback information for preset DCI (e.g., DCI related to Uu communication) to the base station through resource on a PUCCH, and skip transmission of the HARQ feedback information for the other DCI (e.g., DCI related to sidelink). Alternatively, for example, the first device 100 may piggyback the HARQ feedback information for the DCI related to sidelink on HARQ feedback information for DCI related to Uu communication (e.g., DCI related to a DL grant) and transmit it to the base station. Alternatively, for example, the first device 100 may piggyback the HARQ feedback information for the DCI related to Uu communication (e.g., DCI related to a DL grant) on HARQ feedback information for DCI related to sidelink and transmit it to the base station.

For example, resource on a physical sidelink shared channel (PSSCH) related to first sidelink may be scheduled by the base station for the first device 100. For example, at least one of a time domain resource grid or a frequency domain resource grid used for resource allocation for the PSSCH may be set widely.

The above-described embodiment is applicable to various devices described below. For example, a processor 102 of the first device 100 may control a transceiver 106 to receive downlink control information (DCI) related to sidelink from the base station. In addition, the processor 102 of the first device 100 may control the transceiver 106 to transmit feedback information related to reception of the DCI related to sidelink to the base station through a physical uplink channel (PUCCH).

According to an embodiment of the present disclosure, a first device for performing wireless communication may be provided. For example, the first device may include one or more memories configured to store commands; one or more transceivers; and one or more processors connecting the one or more memories and the one or more transceivers. For example, the one or more processors may execute the commands to receive downlink control information (DCI) related to sidelink from a base station and to transmit, to the base station, feedback information related to reception of the DCI related to the sidelink. For example, resource on the PUCCH may be differently configured based on the process ID related to the sidelink.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, the rules may be defined such that information on whether the proposed methods are applied (or information on rules related to the proposed methods) should be transmitted from a BS to a UE or from a transmitting UE to a receiving UE through a predefined signal (e.g., a physical layer signal, a higher layer signal, etc.).

Various embodiments of the present disclosure are applicable not only to vehicle-to-vehicle communication but also vehicle-to-pedestrian communication, vehicle-to-base station communication or vehicle-to-fixed node communication. For example, in communication with the base station, the position and speed of a counterpart receiver may be regarded as being fixed.

Hereinafter, an device, to which various embodiments of the present disclosure are applicable, will be described.

Although not limited thereto, various descriptions, functions, procedures, proposals, methods and/or flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may represent the same or corresponding hardware blocks, software blocks or functional blocks, unless specified otherwise.

Figure 18:
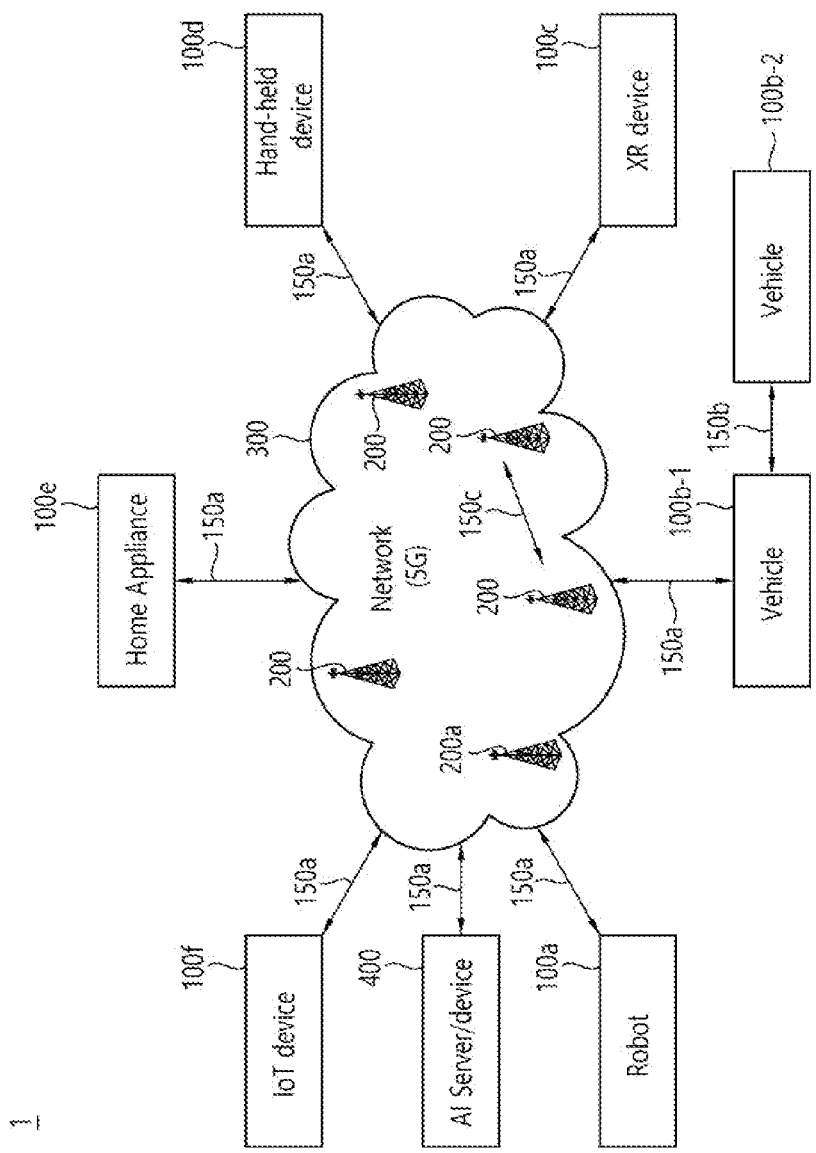
FIG. 18 shows a communication system 1, in accordance with an embodiment of the present disclosure.

FIG. 18 shows a communication system 1, in accordance with an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
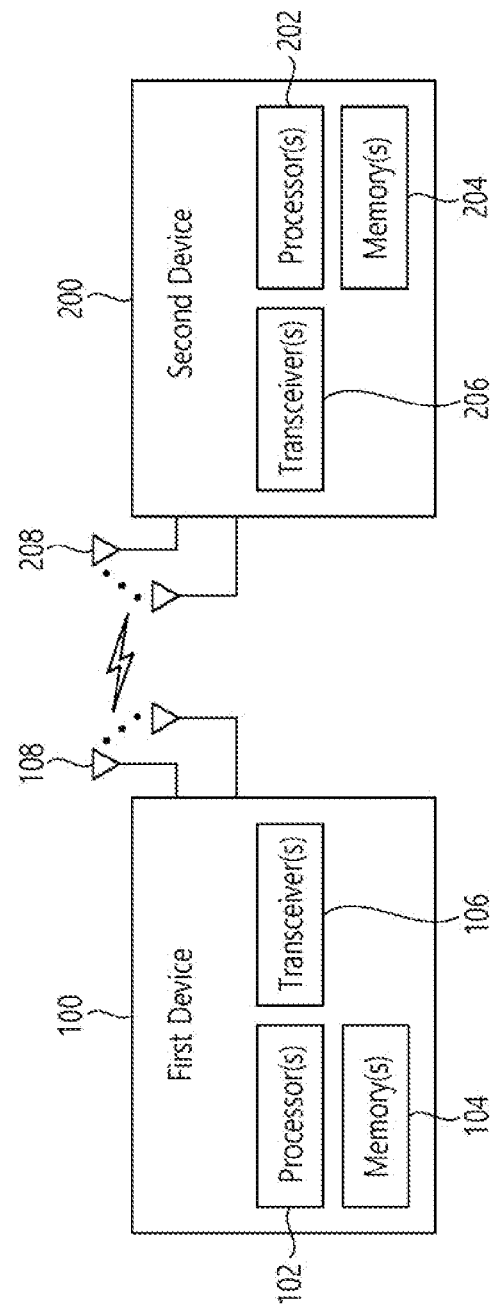
FIG. 19 shows wireless devices, in accordance with an embodiment of the present disclosure.

FIG. 19 shows wireless devices, in accordance with an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
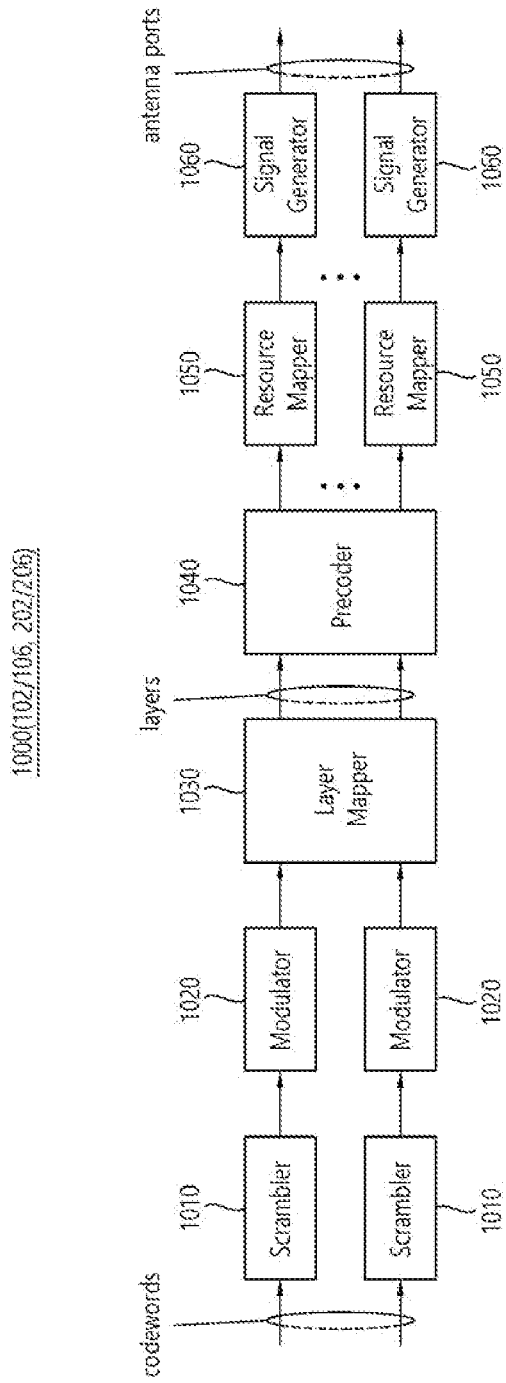
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
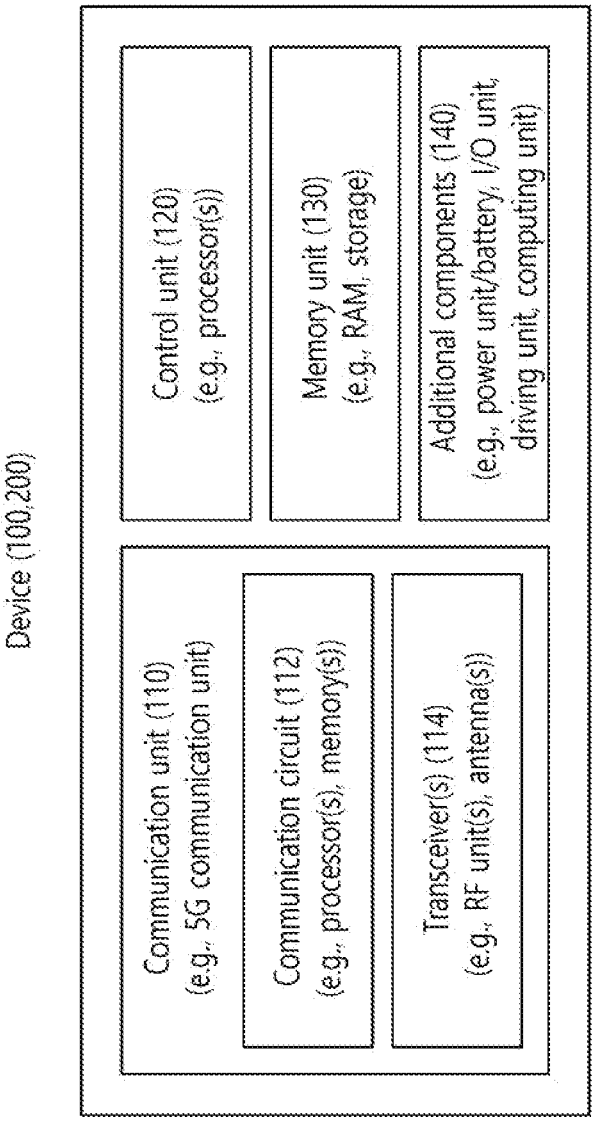
FIG. 21 shows a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BS s (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
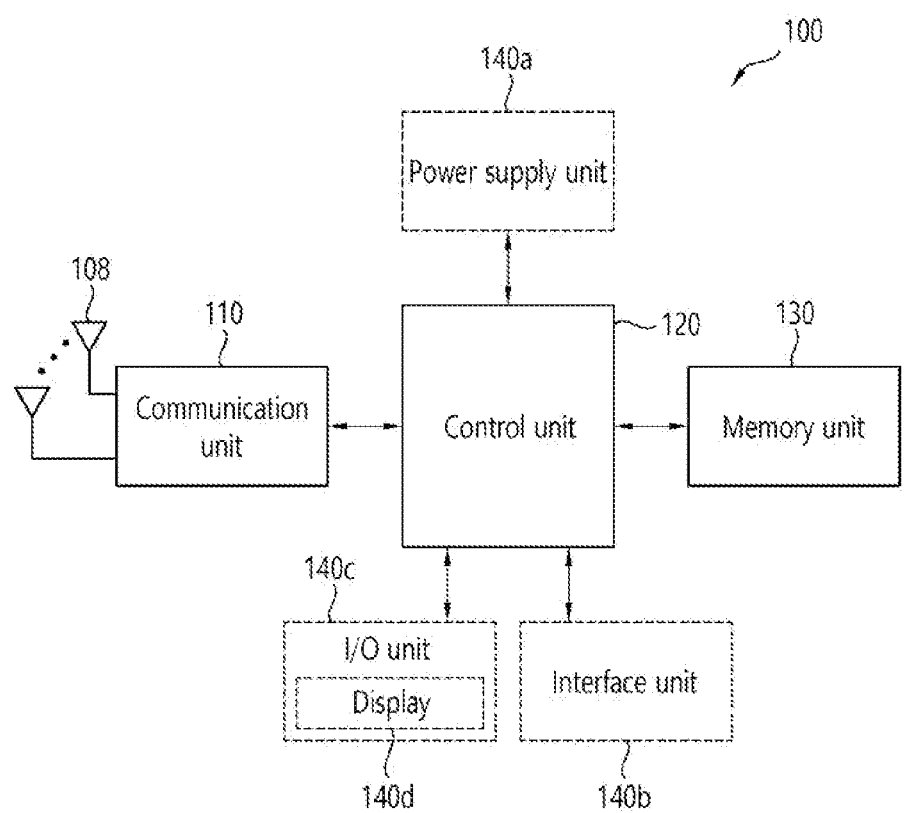
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
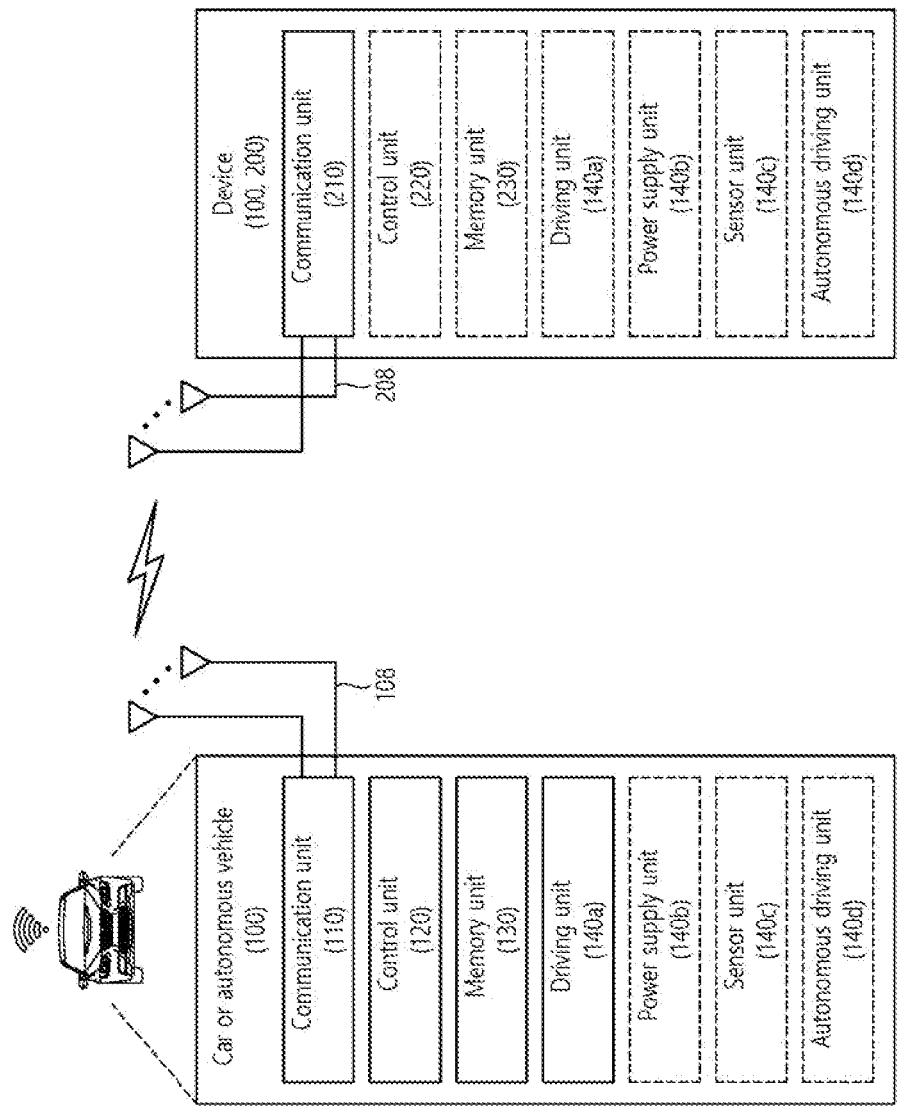
FIG. 23 shows a car or an autonomous vehicle, in accordance with an embodiment of the present disclosure.

FIG. 23 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an device, and technical features in device claims can be combined to be implemented or performed in a method. Further, technical features in method claim(s) and device claim(s) can be combined to be implemented or performed in an device. Further, technical features in method claim(s) and device claim(s) can be combined to be implemented or performed in a method.

The invention claimed is:

1. A method of performing wireless communication by a first device, the method comprising:
    receiving downlink control information (DCI) related to first sidelink from a base station, wherein a sidelink configured grant is configured to the first device, and the sidelink configured grant is activated by the DCI; and
    transmitting, to the base station, a confirmation message through a first medium access control (MAC) control element (CE) including one or more fields,
    wherein a first field corresponding to a first configured grant with a first configured grant index, included in the one or more fields indicates confirmation to activation or deactivation of the first configured grant, and
    wherein the first field is ignored when the first configured grant is not configured to the first device.

2. The method of claim 1,
    wherein the sidelink configured grant is configured the first device by RRC (radio resource control) signaling.

3. The method of claim 1,
    wherein activation of the first configured grant is indicated based on the first field having a first value, and deactivation of the first configured grant is indicated based on the first field having a second value.

4. The method of claim 1,
    wherein the first MAC CE is indicated by a MAC sub-header with a logical channel ID (LCID).

5. The method of claim 1,
    wherein the first MAC CE consists of one octet (octet).

6. The method of claim 1, wherein the first MAC CE includes time information for the DCI related to the first sidelink.

7. The method of claim 6, wherein the time information for the DCI related to the first sidelink includes information related to a start time for a system frame number (SFN) period within a period of the SFN and a time when the DCI related to the first sidelink is received from the base station.

8. The method of claim 6, wherein the time information for the DCI related to the first sidelink includes information related to a time when the first MAC CE is transmitted to the base station through a physical uplink shared channel (PUSCH) and a time when the DCI related to the first sidelink is received from the base station.

9. The method of claim 1, wherein a time when the first device applies the one or more configured grants after receiving the DCI related to the sidelink is determined based on the DCI related to the first sidelink.

10. The method of claim 1, further comprising determining whether the base station has received the confirmation message,
    wherein, based on the base station receiving the confirmation message, sidelink communication is performed based on at least one SPS configuration.

11. The method of claim 1, wherein the first MAC CE includes at least one of application ID information, destination ID information, target device ID information, session ID information, cast type information, service type information, priority information, information related to quality of service (QoS) or process ID information related to the first sidelink.

12. The method of claim 1, further comprising:
    receiving DCI related to Uu communication from the base station; and
    transmitting, to the base station, a confirmation message for reception of DCI related to the Uu communication through a second MAC CE.

13. The method of claim 12, wherein the first MAC CE and the second MAC CE include information for identifying the DCI related to the first sidelink and the DCI related to the Uu communication.

14. The method of claim 1, further comprising receiving DCI related to a second sidelink from the base station,
    wherein, based on the confirmation message for reception of the DCI related to the second sidelink not transmitted to the base station, the confirmation message for reception of the DCI related to the second sidelink is included in the first MAC CE.

15. The method of claim 1,
    wherein the first MAC CE is transmitted to the base station through a physical uplink shared channel (PUSCH).

16. The method of claim 1,
    wherein resource on a physical sidelink shared channel (PSSCH) related to the first sidelink is scheduled by the base station.

17. The method of claim 1, further comprising:
    performing a transmission related to the first sidelink to a second device based on the base station receiving the confirmation message,
    wherein the transmission related to the first sidelink is performed based on the DCI related to the first sidelink.

18. A first device configured for performing wireless communication, the first device comprising:
    one or more memories configured to store commands;
    one or more transceivers; and
    one or more processors functionally connecting the one or more memories and the one or more transceivers,
    wherein the one or more processors are configured to:
    receive downlink control information (DCI) related to first sidelink from a base station, wherein a sidelink configured grant is configured to the first device, and the sidelink configured grant is activated by the DCI; and
    transmit, to the base station, a confirmation message through a first medium access control (MAC) control element (CE) including one or more fields, wherein a first field corresponding a first configured grant with a first configured grant index, included in the one or more fields indicates confirmation to activation or deactivation of the first configured grant, and wherein the first field is ignored when the first configured grant is not configured to the first device.

* * * * *